United States Patent
Oh et al.

(10) Patent No.: US 11,312,628 B2
(45) Date of Patent: Apr. 26, 2022

(54) METHOD FOR ENHANCING TENSILE STRENGTH OF CARBON NANOTUBE FIBER AGGREGATE

(71) Applicant: LG CHEM, LTD., Seoul (KR)

(72) Inventors: Eugene Oh, Daejeon (KR); Juhan Kim, Daejeon (KR); Ji Eun Kim, Daejeon (KR); Jaehong Lee, Daejeon (KR); Won Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 364 days.

(21) Appl. No.: 16/348,352

(22) PCT Filed: Jan. 25, 2018

(86) PCT No.: PCT/KR2018/001091
§ 371 (c)(1),
(2) Date: May 8, 2019

(87) PCT Pub. No.: WO2018/236023
PCT Pub. Date: Dec. 27, 2018

(65) Prior Publication Data
US 2020/0055734 A1    Feb. 20, 2020

(30) Foreign Application Priority Data

Jun. 23, 2017    (KR) .................. 10-2017-0079444

(51) Int. Cl.
*C01B 32/174* (2017.01)

(52) U.S. Cl.
CPC ........ *C01B 32/174* (2017.08); *C01B 2202/26* (2013.01); *C01P 2004/03* (2013.01)

(58) Field of Classification Search
CPC . C01B 32/174; C01B 32/168; C01B 2202/26; C01P 2004/03; C01P 2004/13
See application file for complete search history.

(56) References Cited

U.S. PATENT DOCUMENTS

| | | | |
|---|---|---|---|
| 10,246,333 B1 | 4/2019 | Kim et al. | |
| 2004/0022981 A1 | 2/2004 | Hu et al. | |
| 2009/0215953 A1 | 8/2009 | Hwang et al. | |
| 2011/0110843 A1 | 5/2011 | Pasquali et al. | |
| 2012/0197051 A1 | 8/2012 | Tour et al. | |
| 2012/0276799 A1 | 11/2012 | Lashmore et al. | |
| 2014/0256204 A1 | 9/2014 | Knoff | |
| 2014/0363669 A1 | 12/2014 | Otto et al. | |
| 2015/0152574 A1 | 6/2015 | Barton et al. | |
| 2015/0298164 A1 | 10/2015 | Pasquali et al. | |
| 2016/0222536 A1 | 8/2016 | Schauer et al. | |
| 2016/0340193 A1 | 11/2016 | Uejima | |
| 2019/0233976 A1 | 8/2019 | Oh et al. | |

FOREIGN PATENT DOCUMENTS

| | | |
|---|---|---|
| AU | 2008293884 A1 | 3/2009 |
| CA | 2693403 A1 | 3/2009 |
| CN | 102666378 A | 9/2012 |
| CN | 103827364 A | 5/2014 |
| CN | 104471124 A | 3/2015 |
| CN | 105934543 A | 9/2016 |
| EP | 1461390 A1 | 9/2004 |
| EP | 2857354 A1 | 4/2015 |
| EP | 2964822 A1 | 1/2016 |
| JP | 2005-502792 A | 1/2005 |
| JP | 2005-521779 A | 7/2005 |
| JP | 2010-534772 A | 11/2010 |
| JP | 2011-502925 A | 1/2011 |
| JP | 2015-528072 A | 9/2015 |
| JP | 2016-516137 A | 6/2016 |
| KR | 10-2010-0100847 A | 9/2010 |
| KR | 10-2013-0134102 A | 12/2013 |
| KR | 10-1726823 B1 | 4/2017 |
| KR | 20180047334 A | 5/2018 |
| WO | 2003-004740 A1 | 1/2003 |
| WO | 2009/058855 A2 | 5/2009 |
| WO | 2013034672 A2 | 3/2013 |
| WO | 2014-011460 A1 | 1/2014 |

OTHER PUBLICATIONS

Mirri, Francesca, et al. "High-performance carbon nanotube transparent conductive films by scalable dip coating." ACS nano 6.11 (2012): 9737-9744.*
Behabtu, Natnael, et al. "Strong, light, multifunctional fibers of carbon nanotubes with ultrahigh conductivity." science 339.6116 (2013): 182-186.*
Di, Jiangtao, et al. "Strong, Twist-Stable Carbon Nanotube Yarns and Muscles by Tension Annealing at Extreme Temperatures." Advanced Materials 28.31 (2016): 6598-6605.*
Yu, Hang, et al. "Rapid oxidative activation of carbon nanotube yarn and sheet by a radio frequency, atmospheric pressure, helium and oxygen plasma." Carbon 57 (2013): 11-21.*
Davis, et al., "True solutions of single-walled carbon nanotubes for assembly into macroscopic materials", Nature Nanotechnology vol. 4 (Dec. 2009) pp. 830-834.

* cited by examiner

*Primary Examiner* — Richard M Rump
(74) *Attorney, Agent, or Firm* — Dentons US LLP

(57) ABSTRACT

The present invention relates to a method for enhancing tensile strength of a carbon nanotube (CNT) fiber aggregate, comprising dispersing a CNT fiber aggregate with chlorosulfonic acid (CSA), followed by thermal treatment, wherein a particular magnitude of tension is applied upon the thermal treatment, whereby the CNT fiber aggregate is increased in alignment level and tensile strength.

5 Claims, 2 Drawing Sheets

Comparative Example (Test 1)

Before CSA treatment

Example (Test 8)

After CSA treatment

METHOD FOR ENHANCING TENSILE STRENGTH OF CARBON NANOTUBE FIBER AGGREGATE

The present application is a National Phase entry of PCT/KR2018/001091 filed on Jan. 25, 2018, and claims priority to and the benefit of Korean Patent Application No. 10-2017-0079444, filed on Jun. 23, 2017, the disclosures of which are incorporated herein by reference on their entirety.

FIELD

The present invention relates to a method for improving tensile strength of an aggregate of carbon nanotube (CNT) fibers.

BACKGROUND

Carbon nanotubes (CNTs) are new materials in which hexagons made up of carbon atoms are interconnected to form a tube. CNTs have a similar electrical conductivity to copper, and have thermal conductivity equal to that of diamond, which is the best in nature. The strength of CNTs is as high as 100 times that of iron, and their electric and thermal properties are also good. CNTs are expected to be useful in many industries such as future electric and electronic, information communication, energy, biology, aerospace and sports fields.

The mechanical strength of CNTs themselves, especially the tensile strength, is very high, exceeding 100 GPa. However, synthesized CNTs are short fibers with short lengths and are restricted in application. In order to solve this problem, a method of forming an aggregate of CNTs as long fibers by connecting CNTs as short fibers has been recently studied.

Variables affecting strength of a fiber formed from an aggregate of CNTs, include a length and a diameter of CNTs, and a bonding force between CNTs. In order to improve the tensile strength of an aggregate of CNTs, the bonding force between the CNTs constituting the CNT fibers should be increased. For this purpose, it is necessary to reduce the distance between the CNTs. As the distance between the CNTs is reduced, the alignment degree of the CNTs is improved.

Korean Patent Application No. 10-2016-0143313 suggests a method of improving the alignment degree of CNTs by applying a physical force (ultrasonic wave) to a CNT aggregate to disperse the aggregate and then applying a tensile force to the aggregate to improve its alignment degree. However, the CNTs constituting the CNT aggregate were entangled, so that it was difficult to improve the alignment degree above a certain level, and the increase of the tensile strength was also insignificant. It is also known in the art that CNTs are dissolved in chlorosulfonic acid (CSA) at a concentration of 0.5 wt % or less for a good dispersion of CNTs so that CNTs can be processed into CNT fibers (see, for example, V A Davis, et al., *Nature Nanotechnology* 4, 830-834 (2009)). However, the process wherein CNTs are first synthesized and then processed to CNT fibers is complicated and the tensile strength of the CNT fibers is low.

Therefore, there is a need to develop a new method for improving the alignment degree and improving the tensile strength of a CNT aggregate.

SUMMARY

The present invention aims to improve the alignment degree and tensile strength of a CNT aggregate by using a more effective method without using ultrasonic waves.

In the present invention, tension having a specific strength is used, without using ultrasonic treatment which has a problem that the dispersion degree of CNTs is low and the improvement of tensile strength of CNTs is insignificant.

Specifically, the present invention provides, in one embodiment, a method for improving tensile strength of an aggregate of CNT fibers comprising the steps of:
1) dispersing the aggregate of CNT fibers in chlorosulfonic acid (CSA)
2) treating the aggregate of CNT fibers dispersed in the CSA with a solvent for the removing CSA, thereby removing the CSA; and
3) treating by heating the aggregate of CNT fibers from which the CSA has been removed,
wherein tension is applied simultaneously with each of at least one of the steps 1) to 3), or tension is applied successively after the end of at least one of the steps 1) to 3), and wherein the tension/tex is applied in an amount of 2 to 50 cN/tex, or 3 to 40 cN/tex, or 5 to 35 cN/tex, or 10 to 30 cN/tex.

The present invention provides, in other embodiment, a method for improving tensile strength of an aggregate of CNT fibers comprising the steps of:
1) treating the aggregate of CNT fibers with chlorosulfonic acid (CSA) to disperse CNTs constituting the aggregate of CNT fibers, thereby loosening the aggregate,
2) applying tension to the aggregate of CNT fibers dispersed in the CSA wherein the tension is applied in an amount of 2 to 50 cN/tex;
3) treating the aggregate of CNT fibers with a solvent for removing the CSA in order to wash and shrink the aggregate of CNT fibers; and
4) treating by heating the aggregate of CNT fibers.

In the present specification, "tex" represents a weight per unit length of fiber of 1000 m (for example, 1 tex=1 g/1000 m) and is proportional to thickness.

In one embodiment, the ratio of the aggregate of CNT fibers to 100 parts by weight of CSA is 0.01 to 1.0 parts by weight, and in further embodiments 0.03 to 0.06 parts by weight.

In one embodiment, the solvent for removing CSA used in the present invention may be acetone, ethanol or water. In another embodiment, the solvent may be acetone.

In one embodiment, the heat treatment used in the present invention may be performed under an atmosphere containing oxygen and an inert gas atmosphere. In another embodiment, the heat treatment may be performed under an air atmosphere.

In one embodiment, the heat treatment may be performed at 200 to 400° C. for 5 minutes to 2 hours. In another embodiment, the heat treatment may be performed at 200 to 350° C. for 10 minutes to 1 hour.

According to the method for improving tensile strength of an aggregate of CNT fibers of the present invention, the tensile strength of the aggregate of CNT fibers can be effectively improved by dispersing the aggregate of CNT fibers in CSA, removing the CSA via usage of a CSA removing solvent, and then treating by heating the aggregate of CNT fibers.

DETAILED DESCRIPTION

Figure 1:
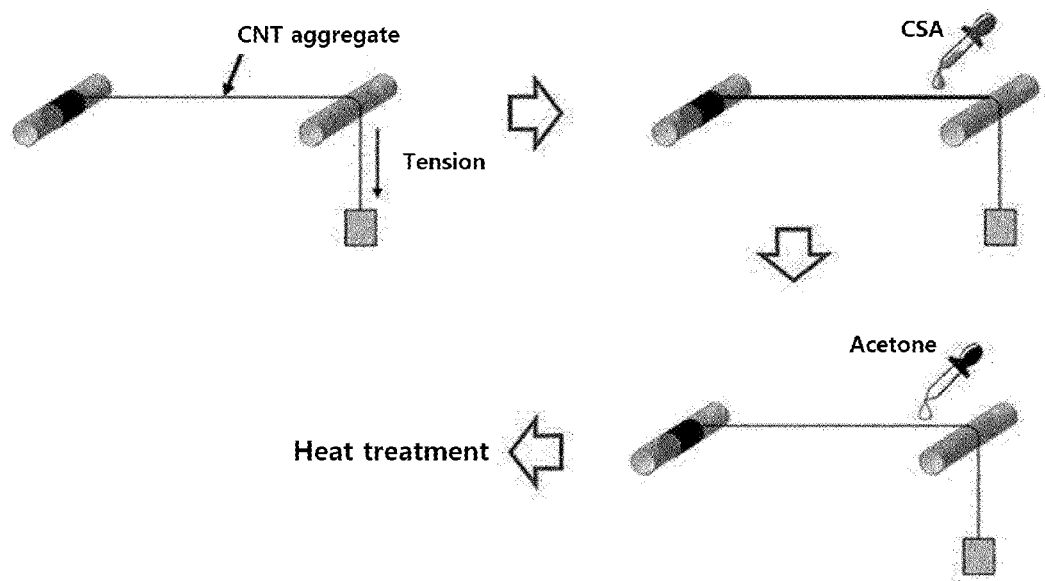
FIG. 1 is an illustration of an example of a process for improving tensile strength of an aggregate of CNT fibers according to the present invention.

The terms and words used in the present specification and claims should not be construed as limited to ordinary or dictionary meanings and should be interpreted with the meaning and concept consistent with the technical idea of the present invention based on the principle that the inventors can appropriately define the concepts of the terms to describe their invention in the best way.

The method for improving tensile strength of an aggregate of CNT fibers according to the present invention comprises the steps of:

1) dispersing the aggregate of CNT fibers in chlorosulfonic acid (CSA);

2) treating the aggregate of CNT fibers dispersed in the CSA with a solvent for removing the CSA, thereby removing the CSA; and 3) treating by heating the aggregate of CNT fibers from which the CSA has been removed, wherein tension is applied simultaneously with each of at least one of the steps 1) to 3), or tension is applied successively after the end of at least one of the steps 1) to 3), and wherein the tension/tex is applied in an amount of 2 to 50 cN/tex or 3 to 40 cN/tex, or 3 to 40 cN/tex, or 5 to 35 cN/tex, or 10 to 30 cN/tex.

Furthermore, the method for improving tensile strength of an aggregate of CNT fibers according to the present invention comprises the steps of:

1) treating the aggregate of CNT fibers with chlorosulfonic acid (CSA) to disperse CNTs constituting the aggregate of CNT fibers, thereby loosening the aggregate;

2) applying tension to the aggregate of CNT fibers dispersed in the CSA wherein the tension is applied in an amount of 2 to 50 cN/tex;

3) treating the aggregate of CNT fibers with a solvent for removing the CSA in order to wash and shrink the aggregate of CNT fibers; and 4) treating by heating the aggregate of CNT fibers.

The method of the present invention will be described in detail in accordance with the respective steps as follows:

Step 1): Dispersing of CNT

CSA is added to disperse an aggregate of CNT fibers. Due to this treatment, the CNTs constituting the aggregate of CNT fibers are not entangled and dispersed well, and the aggregate is loosened. At this stage, the tension/tex can be applied to the aggregate of CNT fibers in an amount of 2 to 50 cN/tex.

Step 2): Removal of CSA and shrinking of CNTs

The loosened aggregate of CNT fibers is aligned. The aligned aggregate of CNT fibers is washed with a solvent for removing CSA such as acetone, ethanol or water. As a result, the dispersed aggregate of CNT fibers can be shrunk to maintain the aggregate shape. At this stage, the tension/tex can be applied to the aggregate of CNT fibers in an amount of 2 to 50 cN/tex.

Step 3): Heat treatment

The aggregate of CNT fibers is heat-treated to remove residual CSA or solvent for removing remained CSA in the aggregate of CNT fibers thereby further shrinking the aggregate of CNT fibers. The heat treatment may be performed under an atmosphere containing oxygen and an inert gas atmosphere, for example, under an air atmosphere at 200 to 400° C. for 5 minutes to 2 hours, for example at 300° C. for 30 minutes. At this stage, the tension/tex can be applied to the aggregate of CNT fibers in an amount of 2 to 50 cN/tex.

An example of a process including the above steps is shown in FIG. 1 as an illustration of a process for improving tensile strength of an aggregate of CNT fibers.

Hereinafter, the present invention will be described in more detail with reference to Examples. It will be apparent to those skilled in the art that the following examples are merely intended to be illustrative of the present invention and not to be construed as limiting the scope of the invention.

Examples 1 to 13

Figure 3:
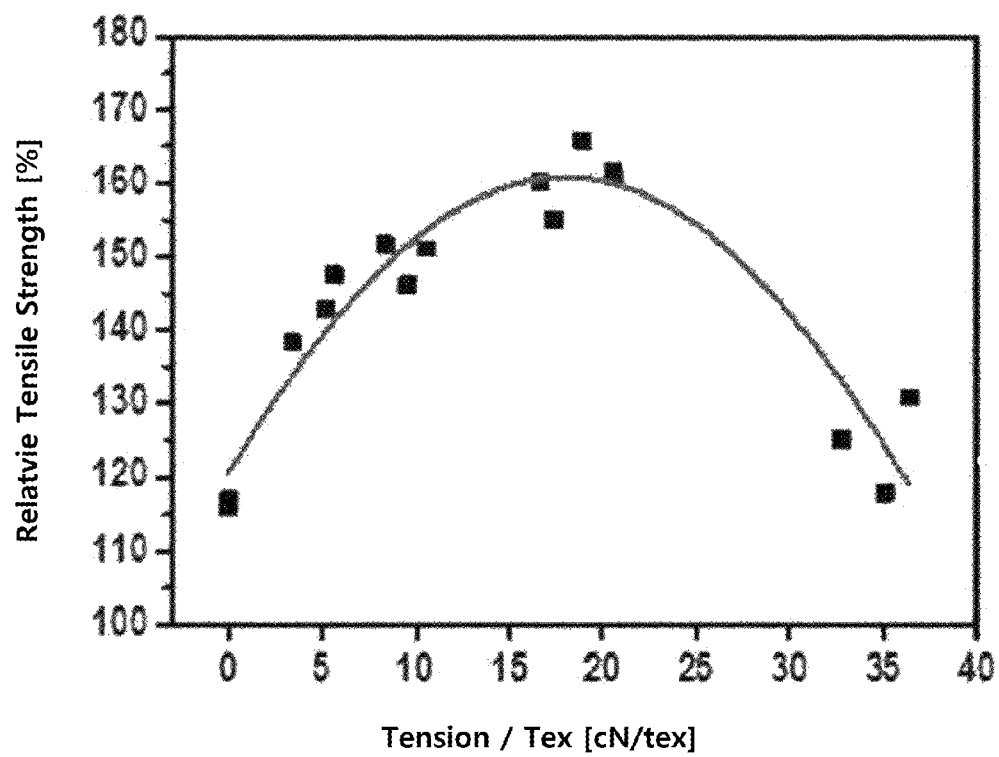
FIG. 3 is a graph showing relative tensile strength according to tension/tex applied to an aggregate of CNT fibers in Examples 1 to 13.

As shown in FIG. 1, one end of an aggregate of CNT fibers (0.007 mg) was fixed to a glass rod and the other end of the aggregate of CNT fibers was connected to the weights, and the aggregate of CNT fibers was set so that the tension/tex was applied thereto in an amount of 3 to 40 cN/tex by controlling the weights in order to perform each of Examples 1 to 13. CSA (0.01 mL) as a CNT dispersant was sprinkled on the aggregates of CNT fibers by a spuit. When the CSA treatment was finished, acetone (1 mL) was sprinkled onto the aggregates of CNT fibers by a spuit to remove residual CSA and to shrink the aggregates of CNT fibers. The aggregates of CNT fibers was heat-treated at 300° C. for 30 minutes in an air atmosphere to remove remained CSA and acetone in the aggregates of CNT fibers. The relative tensile strength of the heat-treated aggregates of CNT fibers was measured at a speed of 2 mm/min using FAVIMAT+ instrument of Textechno, Germany (load cell range: 210 cN, gauge length: 2.0 cm). The measurement results are shown in Table 1 below. In addition, the relative tensile strength obtained according to the tension/tex applied to the aggregates of CNT fibers is shown as a graph in FIG. 3.

Comparative Examples 1 to 3

Aggregates of CNT fibers were tested in the same manner as in the above examples except that tension was not applied to the aggregates of CNT fibers, and neither heat treatment nor CSA treatment were performed. The measurement results of the tensile strength are shown in Table 2 below.

Comparative Examples 4 and 5

Aggregates of CNT fibers were tested in the same manner as in the above examples except that neither tension was applied to the aggregates of CNT fibers nor CSA treatment was performed. The measurement results of the tensile strength are shown in Table 2 below.

Comparative Examples 6 and 7

Aggregates of CNT fibers were tested in the same manner as in the above examples except that tension was not applied to the aggregates. The measurement results of the tensile strength are shown in Table 2 below.

TABLE 1

| Example | CSA Treatment | CSA removing solvent | Heat Treatment | Tension/tex [cN/tex] | Relative Tensile Strength [%] |
|---|---|---|---|---|---|
| 1 | O | Acetone | Air, 300° C. 30 min | 3.4 | 138.4 |
| 2 | | | | 5.2 | 142.9 |
| 3 | | | | 5.6 | 147.5 |
| 4 | | | | 8.3 | 151.7 |
| 5 | | | | 10.5 | 151.1 |
| 6 | | | | 16.7 | 160.1 |
| 7 | | | | 17.4 | 155.1 |
| 8 | | | | 18.9 | 165.7 |
| 9 | | | | 20.6 | 160.7 |
| 10 | | | | 20.6 | 161.8 |
| 11 | | | | 32.8 | 125.3 |
| 12 | | | | 35.1 | 118.0 |
| 13 | | | | 36.4 | 130.9 |

TABLE 2

| Comp. Example | CSA Treatment | CSA removing solvent | Heat Treatment | Tension/tex [cN/tex] | Relative Tensile Strength | Avg. Relative Tensile strength |
|---|---|---|---|---|---|---|
| 1 | X | X | X | 0 | 100.0 (Base) | 100.3 |
| 2 | | | | 0 | 100.0 | |
| 3 | | | | 0 | 101.1 | |
| 4 | X | X | Air, 300° C. 30 min | 0 | 115.3 | 114.3 |
| 5 | | | | 0 | 113.3 | |
| 6 | O | Acetone | Air, 300° C. 30 min | 0 | 117.3 | 117.1 |
| 7 | | | | 0 | 116.8 | |

In the Tables 1 and 2 above, "Relative Tensile Strength" represents the tensile strength of the CNT fibers in Examples and Comp. Examples when the tensile strength of the CNT fibers without any treatment is taken as 100 (based on Comparative Example 1).

As shown in the above Tables 1 and 2, the average relative tensile strength of the aggregates of CNT fibers from Comparative Examples 1 to 3 (untreated with CSA, tension not applied and no heat treatment) was 100.3, the average relative tensile strength of the aggregates of CNT fibers from Comparative Examples 4 and 5 (untreated with CSA, tension not applied and heat treatment) was 114.3, and the average relative tensile strength of the aggregates of CNT fibers from Comparative Examples 6 and 7 (tension not applied, treated with CSA and heat treatment) was 117.1. In contrast, the average relative tensile strength of CNT aggregates from Examples 1 to 13 (CSA treatment, acetone solvent, tension/tex of 3.4 to 36.4 cN/tex applied and heat treatment) according to the present invention is 146.9. From this, it is calculated that the average relative tensile strength of Examples 1 to 13 according to the present invention was increased by 46.5%, by 28.5%, and by 25.4%, respectively, as compared with the average relative tensile strength of Comparative Examples 1 to 3, Comparative Examples 4 and 5, and Comparative Examples 6 and 7.

Figure 2:
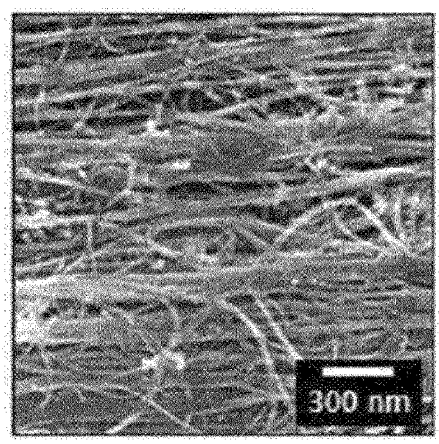
FIG. 2 is a result of the scanning electron microscope (SEM) analysis of shrinkage and alignment of an aggregate of CNT fibers according to the dispersion or non-dispersion of an aggregate of CNT fibers in CSA in Comparative Examples 1 to 5 and Examples 1 to 13.
Figure 2:
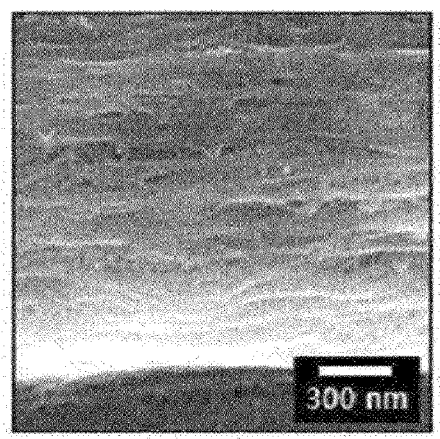

Furthermore, from FIG. 2, which shows the results of SEM analysis of the aggregates of CNT fibers of Comparative Examples 1 to 5, which are not treated with CSA, and the aggregates of CNT fibers of Examples 1 to 13 according to the present invention, which are treated with CSA, it is found that aggregates of CNT fibers are further shrunk and the degree of alignment of the aggregates is improved after treatment with CSA.

Therefore, it can be seen that the aggregates of CNT fibers obtained by dispersing in CSA with application of specific range of tensile force and heat treatment according to the present invention, are better aligned and have the improved tensile strength, compared with the aggregates of CNT fibers having no CSA treatment, no tension application and no heat treatment, the aggregates of CNT fibers having no tension application and no CSA treatment and having heat treatment, and aggregates of CNT fibers having no tension application and having CSA treatment and heat treatment.

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

What is claimed is:

1. A method for improving tensile strength of an aggregate of carbon nanotube (CNT) fibers, comprising the steps of:
   1) dispersing the aggregate of CNT fibers in chlorosulfonic acid (CSA);
   2) treating the aggregate of CNT fibers dispersed in the CSA with a solvent for removing the CSA, thereby removing the CSA; and
   3) treating by heating the aggregate of CNT fibers from which the CSA has been removed at 200 to 400° C. for 5 minutes to 2 hours;
   wherein tension is applied to at least one of the steps 1) to 3), and the tension/tex is applied in an amount of 2 to 50 cN/tex, and the ratio of the aggregate of CNT fibers to 100 parts by weight of the CSA in the step 1) is 0.01 to 1.0 parts by weight.

2. The method for improving tensile strength of the aggregate of CNT fibers according to claim 1, wherein tension is applied simultaneously with each of at least one of the steps 1) to 3).

3. The method for improving tensile strength of the aggregate of CNT fibers according to claim 1, wherein tensile is applied successively after the end of at least one of the steps 1) to 3).

4. The method for improving tensile strength of the aggregate of CNT fibers according to claim 1, wherein the solvent for removing the CSA in the step 2) is selected from the group consisting of acetone, ethanol and water.

5. The method for improving tensile strength of the aggregate of CNT fibers according to claim 1, wherein the heat treatment in the step 3) is performed under an atmosphere containing oxygen and an inert gas atmosphere.

* * * * *